(12) United States Patent
Reinken et al.

(10) Patent No.: US 10,807,519 B2
(45) Date of Patent: Oct. 20, 2020

(54) STEP TREAD LUMINAIRE

(71) Applicant: Innotec, Corp., Zeeland, MI (US)

(72) Inventors: Philip M. Reinken, Holland, MI (US); Jason R. Mulder, Caledonia, MI (US)

(73) Assignee: INNOTEC, CORP., Zeeland, MI (US)

( * ) Notice: Subject to any disclaimer, the term of this patent is extended or adjusted under 35 U.S.C. 154(b) by 0 days.

(21) Appl. No.: 16/327,889

(22) PCT Filed: Nov. 5, 2018

(86) PCT No.: PCT/US2018/059206
§ 371 (c)(1),
(2) Date: Feb. 25, 2019

(87) PCT Pub. No.: WO2019/090219
PCT Pub. Date: May 9, 2019

(65) Prior Publication Data
US 2020/0207259 A1 Jul. 2, 2020

Related U.S. Application Data

(60) Provisional application No. 62/582,057, filed on Nov. 6, 2017.

(51) Int. Cl.
*F21S 8/00* (2006.01)
*B60Q 1/32* (2006.01)
*F21S 41/24* (2018.01)
*F21S 41/29* (2018.01)
*B60Q 1/26* (2006.01)
*B60R 3/00* (2006.01)
*F21W 102/40* (2018.01)

(52) U.S. Cl.
CPC .............. *B60Q 1/323* (2013.01); *B60Q 1/263* (2013.01); *B60R 3/002* (2013.01); *F21S 41/24* (2018.01); *F21S 41/29* (2018.01); *F21W 2102/40* (2018.01)

(58) Field of Classification Search
CPC ...................................................... B60Q 1/323
See application file for complete search history.

(56) References Cited

U.S. PATENT DOCUMENTS

| 1,439,210 | A | | 12/1922 | Webster et al. | |
|---|---|---|---|---|---|
| 5,430,627 | A | * | 7/1995 | Nagano | F21V 15/013 362/146 |
| 5,915,830 | A | * | 6/1999 | Dickson | B60R 3/002 362/495 |
| 7,048,284 | B1 | | 5/2006 | Seifert | |
| 9,963,066 | B1 | * | 5/2018 | Salter | B60R 3/002 |

(Continued)

OTHER PUBLICATIONS

International Search Report and Written Opinion from PCT/US2018/059206 dated Jan. 18, 2019.

*Primary Examiner* — Matthew J. Peerce
(74) *Attorney, Agent, or Firm* — Warner Norcross + Judd LLP

(57) ABSTRACT

The specification discloses a step tread luminaire including an optic and a light source directing light into the optic. The optic is a flexible elastomer adapted to be fitted into a hole in a step tread in grommet-like fashion with an upper portion of the optic on the top of the tread and a lower portion of the optic on the bottom of the tread. The optic emits upwardly directed, decorative light from the upper portion of the optic and downwardly directed, functional light from the lower portion of the optic.

6 Claims, 4 Drawing Sheets

(56) References Cited

U.S. PATENT DOCUMENTS

| | | |
|---|---|---|
| 2013/0201714 A1 | 8/2013 | Huang-Tsai |
| 2014/0291957 A1 | 10/2014 | Muhe-Sturm et al. |
| 2015/0197180 A1 | 7/2015 | Salter et al. |
| 2016/0121785 A1 | 5/2016 | Wang |
| 2019/0047477 A1* | 2/2019 | Crandall ................ B60R 3/002 |

* cited by examiner

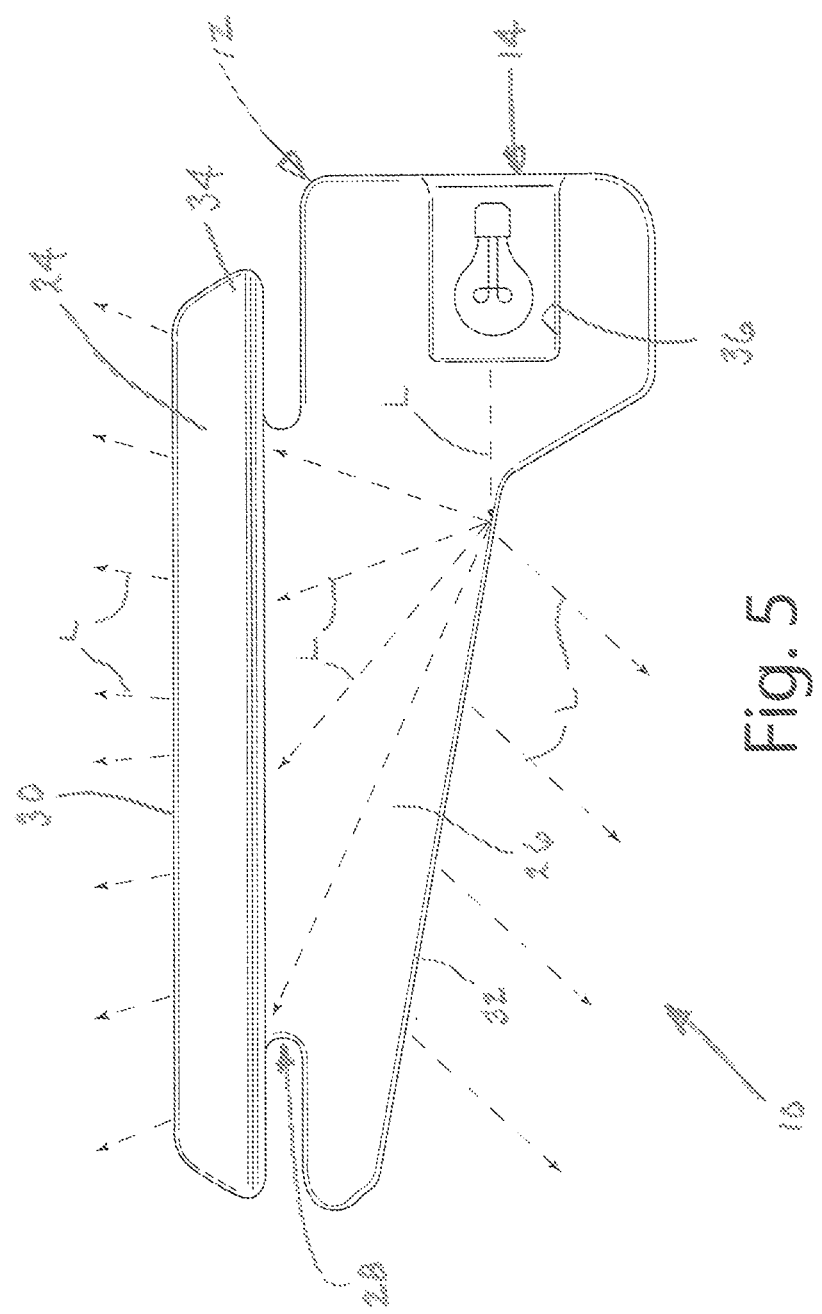

STEP TREAD LUMINAIRE

BACKGROUND OF THE INVENTION

The present invention relates to luminaires, and more particularly to luminaires for step treads.

The applicant is not aware of a standard or other form of light specifically for recreational vehicle (RV) steps. Some people drape holiday-type lights or rope lights on their steps after reaching each destination. However, such lights must be repeatedly put up, taken down, and stored from destination to destination. This handling can damage the lights. Further the lights, when draped at a destination, can pose a tripping or snagging hazard.

The applicant believes the most common approach to illuminating RV steps is to mount sconce-style lighting on the side of the RV and to direct the lighting in the area of the step. However, this causes shadows and can make it difficult for someone using the steps to see where one step starts and another step ends.

SUMMARY OF THE INVENTION

The aforementioned issues are addressed by the luminaire of the present invention. The luminaire includes an optic and a light source directing light into the optic. The optic is a resiliently flexible elastomer adapted to be fitted into a hole in a step tread in grommet-like fashion. An upper portion of the optic is on the top of the tread, and a lower portion of the optic is on the bottom of the tread. The optic emits light generally upwardly from the upper portion and emits light generally downwardly from the lower portion.

The luminaire enables grommet-style insertion of the luminaire into a hole in a step tread. The luminaire provides light both above the step tread and below the step tread. In the current embodiment, the upwardly directed light provides a glowing effect and the downwardly directed light provides functional light to the step tread below.

These and other advantages and features will be more fully understood and appreciated by reference to the descriptions of the current embodiments and the drawings.

BRIEF DESCRIPTION OF THE DRAWINGS

FIG. 5 is a side view of the luminaire.

DESCRIPTIONS OF THE CURRENT EMBODIMENTS

Figure 1:
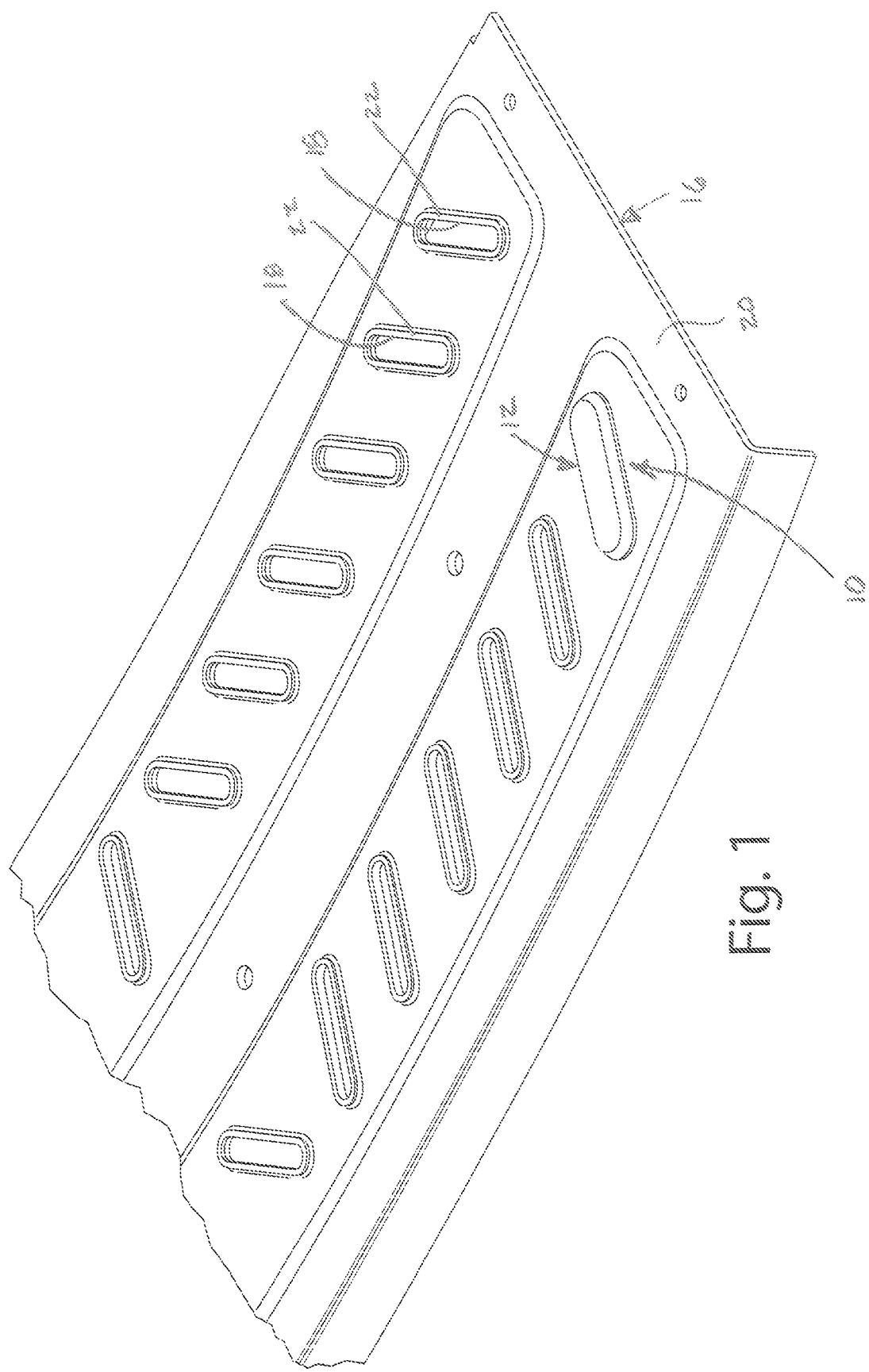
FIG. 1 is a top perspective view of a luminaire in accordance with the present invention mounted within a step tread.

Before the embodiments of the invention are explained, it is to be understood that the invention is not limited to the details of operation or to the details of construction; and the arrangement of the components set forth in the following description or illustrated in the drawings. The invention may be implemented in various other embodiments and may be practiced or carried out in alternative ways not expressly disclosed herein.

In addition, it is to be understood that the phraseology and terminology used herein are for the purpose of description and should not be regarded as limiting. The use of "including" and "comprising" and variations thereof encompasses the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y, and Z" is meant to include any one or more of X, Y, or Z individually, and any combination of any one or more of X, Y, and Z, for example, X, Y, Z; X, Y; X, Z; and Y, Z.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

I. Luminaire

A luminaire constructed in accordance with a current embodiment of the invention is illustrated in the drawings and generally designated 10. The luminaire 10 includes an optic 12 and a light source 14.

Figure 2:
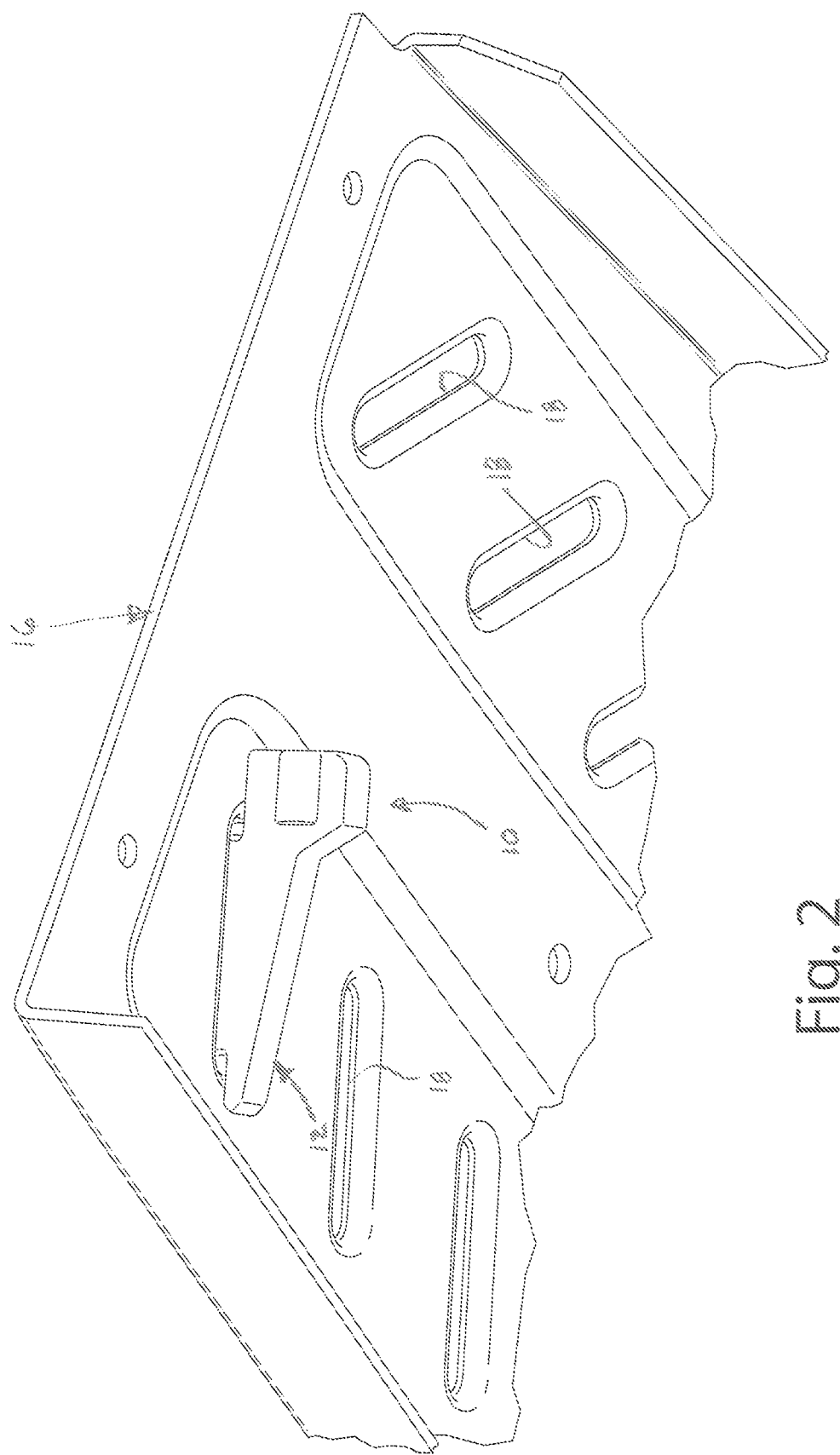
FIG. 2 is a bottom perspective view of the luminaire mounted within the step tread.
Figure 3:
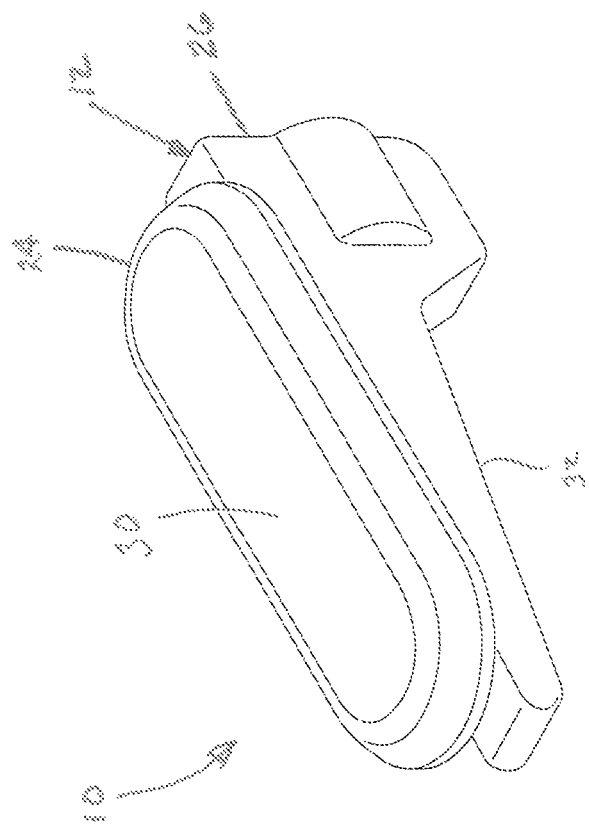
FIG. 3 is a top perspective view of the luminaire.
Figure 4:
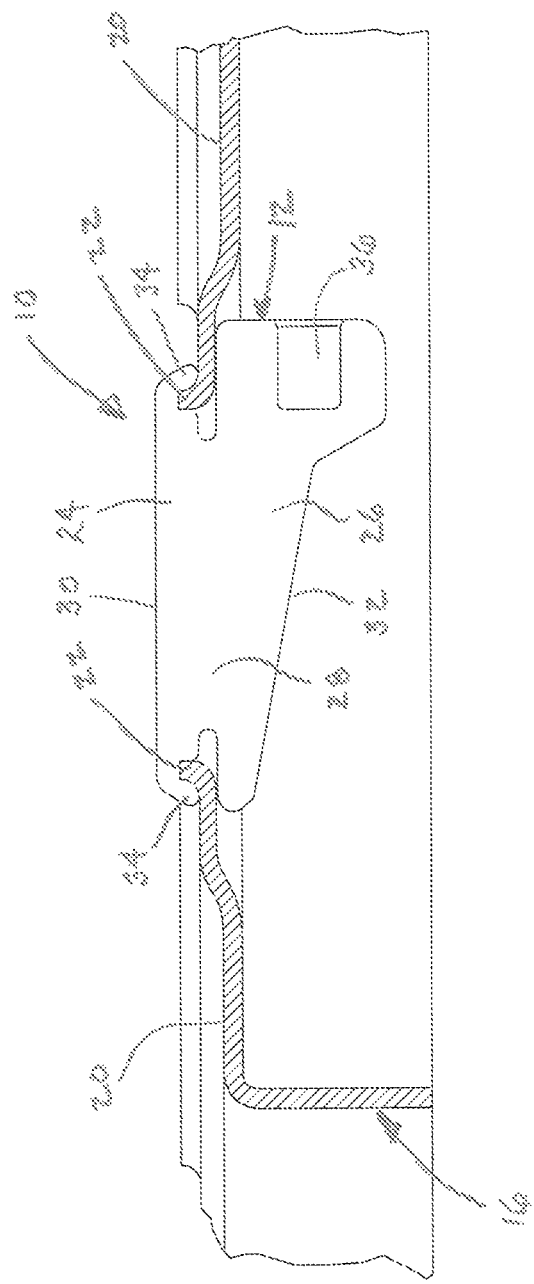
FIG. 4 is a cross-sectional view of the luminaire optic, without the light source, mounted within the tread.

Before further describing the luminaire 10, it is noted that the luminaire is designed for installation within a step tread 16 as illustrated in FIGS. 1-2 and 4. The illustrated tread 16 is typical of a tread for a recreational vehicle (RV). The current tread is fabricated of steel and is formed using conventional metal forming techniques. The tread 16 includes an upper surface 20 defining a plurality of holes 18. Each hole 18 is racetrack shaped, i.e. oblong with straight sides and rounded ends. Although a particular hole shape is disclosed, the present invention is adaptable to holes of essentially any shape and/or configuration. Each hole 18 includes an upwardly projecting peripheral lip 22 (see especially FIG. 4). The lips 22 provide improved traction on the tread 16. As will be appreciated, the disclosed step 16 is exemplary, and the present invention may be used with essentially any step tread having holes.

Returning to describing the luminaire 10, the optic 12 currently is fabricated of a resiliently flexible, transparent or translucent material capable of conducting light. The optic 12 acts as a light pipe as will be described. In the current embodiment, the optic 12 is an elastomer such as silicone, polyvinyl chloride (PVC), polyurethane, or thermoplastic elastomer (TPE). Preferably, the material is selected to provide a relatively high coefficient of friction (COF), at least in comparison to the COF of the upper surface 20 of the tread 16. Consequently, when the luminaire 10 is installed in the tread 16, the luminaire provides improved traction for one stepping on the tread. Alternatively, the optic 12 may be fabricated of any other suitable materials known to those skilled in the art.

The optic 12 includes an enlarged upper portion 24, an enlarged lower portion 26, and a narrow portion 28 in between the upper and lower portions. The upper portion 24 includes an upper surface 30 through which light is emitted. The upper surface 30 may be treated using known techniques (e.g. texturing or etching) to create desired effects (e.g. drawing light in desired directions from the light source 14.) The lower portion 26 includes a lower surface 32 through which light is emitted. The lower surface 32 also may be treated using known techniques to create desired effects. In the current embodiment, the upper surface 30 is treated to provide a decorative or "glow" effect; and the lower surface 32 is treated to provide a functional effect. Consequently, the light emitted through the upper surface 30 assists in the identification of the step tread in low ambient light conditions; and the light emitted through the lower surface 32 assists in illuminating a step tread (not illustrated) located below the step tread 16 in which the luminaire 10 is mounted.

The upper portion 24 of the luminaire 10 is racetrack shaped (when viewed from above) and has a shape and size corresponding to the hole 18. The upper portion 24 is larger than the hole 18 and is located above the tread 16 when the luminaire 10 is installed within the hole. The upper portion 24 includes a skirt 34 around its perimeter. The skirt 34 fits over the lip 22 of a hole 18 when the luminaire 10 is installed within the hole. The skirt 34 assists in positioning and securing the luminaire 10 within the hole 18; and the skirt provides a neat, finished appearance to the installed luminaire 10.

The lower portion 26 also is larger than the hole 18 and is located below the tread 16 when the luminaire 10 is installed within the hole. The upper portion 24 and the lower portion 26 "sandwich" the step tread 16 therebetween to secure the luminaire 10 in position.

The narrow portion 28, located between the upper and lower portions 24 and 26 is the same size as or smaller than the hole 18, so that the narrow portion 28 can be fitted or located within the hole.

The lower portion 26 of the optic 12 defines a receiver socket 36 (see FIGS. 4-5). The light source 14 is received within the socket 36 to direct light into the optic 12. The light source 14 may be any suitable light source now known or later developed. The light source in the current embodiment includes one or more light emitting diodes (LEDs) and an appropriate lens.

Preferably the light source 14 is sealed within the socket 36 so as to provide a waterproof connection and/or seal. The light source 14 and its associated wiring could be carried by a mounting plug (not specifically shown) that seals the light and the wiring within the socket 36. Alternatively, the light source 14 could be molded within the optic 12.

II. Installation and Function

The luminaire 10 is inserted into the hole 18 most typically by first inserting the optic 12 from above and second inserting the light source 14 into the optic 12. The optic 12 may be inserted into the tread 16 by "cocking" the optic so that the lower portion 26 may pass through the hole 18. As the optic 12 is inserted, the skirt 34 passes over the lip 22 of the hole 18. Finally, the optic 10 is fully depressed into the hole so that the enlarged portion 26 resiliently flexes to fully pass below the hole 18. As described, the optic 12 is inserted into the step 16 in grommet-like or grommet-style fashion. The simple design and provides a securely mounted luminaire 10 within the tread step 16.

With the optic 12 inserted into the step tread 16 as described in the previous paragraph, the light source 14 is inserted into the socket 36 in the optic 10 from below the tread 16. The light source 14 is additionally connected to power so that the light source may be illuminated.

The light pipe would direct the light in the upward and downward direction and provide a locking feature for the optic and the light pipe within the optic.

As illustrated in FIG. 5, the optic 12 provides a light pipe function. Specifically, the optic 12 conducts and reflects light L from the light source 14 to and through the upper surface 30 and the lower surface 32. As previously described, the surfaces may be treated to provide upwardly directed decorative light and downwardly directed functional light.

III. Alternatives and Advantages

Although the luminaire 10 has been described in conjunction with an RV step tread 16, the luminaire is readily adaptable to step treads in other applications. This product may be used in any application where there is a tread hole. This product may be used in bleachers, RV steps, other temporary step applications, railings on walkways, around porches/decks, or any other location having a limited mount location and a hole in which to install the light.

Indeed, the luminaire 10 is readily adaptable to installation within any object defining a hole.

The luminaire 10 provides a number advantages. First, the luminaire 10 provides decorative illumination on top of the step 16 and functional illumination on the bottom of the step, for example, light on the step below. Second, the luminaire 10, and more specifically the optic 12, provide a relatively high coefficient of friction to reduce the likelihood of slippage on the step 16.

The above descriptions are those of current embodiments of the invention. Various alterations and changes can be made without departing from the spirit and broader aspects of the invention as defined in the appended claims, which are to be interpreted in accordance with the principles of patent law including the doctrine of equivalents.

This disclosure is illustrative and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as alternatives.

Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A step tread assembly comprising:
   first and second step treads, the first step tread above the second step tread, the first step tread having a top and a bottom, the first step tread defining a hole extending through the first step tread including through the top and the bottom; and
   a luminaire including a one-piece optic and a light source adapted to direct light into the optic, the optic including an upper portion adjacent the top of the first step tread, the upper portion adapted to emit light from the light source in a generally upward direction, the light emitted by the upper portion being decorative light to assist in the identification of the first step tread in low ambient light conditions, the optic further including a lower portion adjacent the bottom of the first step tread, the lower portion adapted to emit light from the light source in a generally downward direction, the light emitted by the lower portion being functional light to illuminate the second step tread below the first step tread, the optic further including a narrow portion connecting the upper portion and the lower portion, the narrow portion within the hole, the optic being resiliently flexible and secured within the hole in grommet-like fashion with the upper portion above the first step tread, the lower portion below the first step tread, and the narrow portion within the hole, the upper and lower portions sandwiching the first step tread therebetween.

2. A step tread assembly as defined in claim 1 wherein:
the hole includes an upwardly projecting peripheral lip; and
the upper portion of the optic includes a skirt around its perimeter, the skirt fitting over the lip of the hole.

3. A luminaire for mounting in a hole extending through a top and a bottom of a first step tread and above a second step tread, the luminaire comprising:
a light source; and
a one-piece optic operatively connected to the light source to receive light from the light source, the optic including an upper portion adapted to emit light from the light source in an upward direction, the light emitted in the upward direction being decorative light to assist in the identification of the first step tread in low ambient light conditions, the optic further including a lower portion adapted to emit light from the light source in a downward direction, the light emitted in the downward direction being functional light to illuminate the second step tread below the first step tread, the optic including a narrow portion connecting the upper portion and the lower portion, the optic being resiliently flexible so as to be capable of mounting within the first step tread hole in grommet-like fashion with the upper portion adjacent a top of the first step tread the lower portion adjacent a bottom of the first step tread, and the narrow portion within the hole in the first step tread, the upper and lower portions sandwiching the first step tread therebetween.

4. A step tread assembly as defined in claim 3 wherein:
the hole includes an upwardly projecting peripheral lip; and
the upper portion of the optic includes a skirt around its perimeter, the skirt fitting over the lip of the hole when the optic is installed in the hole.

5. A method of installing a luminaire within a hole in a step tread, wherein the method comprises:
providing a luminaire including a one-piece optic and a light source adapted to direct light into the optic, the optic being resiliently flexible, the optic including an upper portion, a lower portion, and a narrow portion connecting the upper portion and the lower portion, the upper portion emitting decorative light in a generally upward direction to assist in the identification of the step tread in low ambient light conditions, the lower portion emitting functional light in a generally downward direction; and
installing the luminaire within the hole in the step tread by installing the optic in the hole in grommet-like fashion by (a) cocking the optic so that the lower portion may pass through the hole and (b) depressing the optic into the hole (c) so that the lower portion resiliently flexes to fully pass below the hole, whereby the upper portion is adjacent the top of the step tread, the lower portion is adjacent the bottom of the step tread, and the narrow portion is within the hole in the step tread, the upper and lower portions sandwiching the step tread therebetween.

6. A method as defined in claim 5 wherein:
the hole includes an upwardly projecting peripheral lip;
the upper portion includes a skirt around its perimeter; and
the installing step includes fitting the skirt over the lip of the hole.

\* \* \* \* \*